Figure 1:
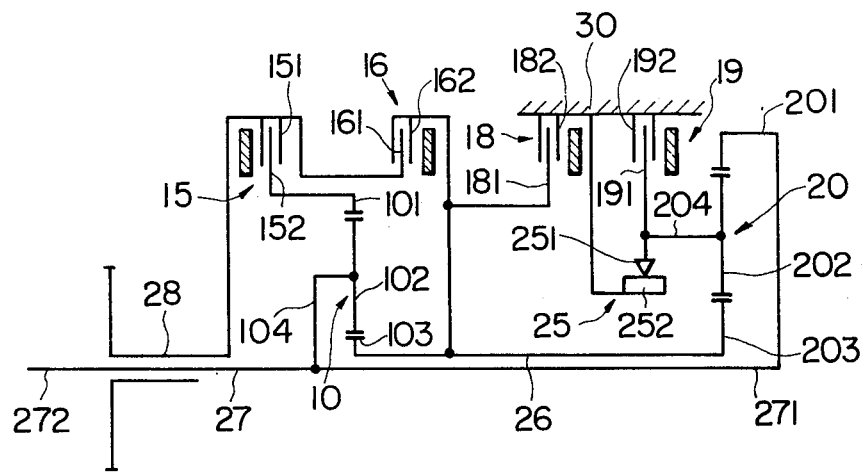

United States Patent [19]

Kuramochi et al.

[11] 4,063,468

[45] Dec. 20, 1977

[54] CHANGE-SPEED GEAR SYSTEM FOR USE IN AUTOMATIC TRANSMISSIONS

[75] Inventors: Kojiro Kuramochi; Kazuaki Watanabe; Kiyoshi Onuma, all of Toyota, Japan

[73] Assignee: Toyota Jidosha Kogyo Kabushiki Kaisha, Toyota, Japan

[21] Appl. No.: 677,372

[22] Filed: Apr. 15, 1976

[51] Int. Cl.² ............................................. F16H 57/10
[52] U.S. Cl. ........................................ 74/763; 74/767
[58] Field of Search ................ 74/753, 762, 763, 766, 74/767

[56] References Cited

U.S. PATENT DOCUMENTS

| 3,418,871 | 12/1968 | Cartwright et al. | 74/763 |
| 3,924,491 | 12/1975 | Kalversberg | 74/763 |

FOREIGN PATENT DOCUMENTS

| 1,025,608 | 4/1953 | France | 74/763 |
| 2,006,411 | 8/1971 | Germany | 74/763 |

*Primary Examiner*—Stephen C. Bentley
*Attorney, Agent, or Firm*—Finnegan, Henderson, Farabow & Garrett

[57] ABSTRACT

A change-speed gear system for use in an automatic transmission, which includes a center output shaft, hollow input and intermediate shafts coaxially disposed around the center output shaft, first and second planetary gear mechanisms, first and second selectively actuatable clutches, and first and second selectively actuatable brakes.

Sun gears of the two planetary gear mechanisms are secured to the intermediate shaft while the planetary carrier and the ring gear respectively of the first and second planetary gear mechanisms are secured to the output shaft.

Driving portions of the two clutches are coupled to the input shaft while drivable portions of the first and second clutches are respectively coupled to the ring gear of the first planetary gear mechanism and to the intermediate shaft. Movable portions of the first and second brakes are respectively coupled to the intermediate shaft and to the planetary carrier of the second planetary gear mechanism. The above arrangement not only provides a change-speed gear system which has three forward-speed gear ratios and one reverse-speed ratio by selective actuation of the clutches and brakes, but also provides a change-speed gear system which allows the automatic transmission to be alternatively used in various types of vehicular drive systems such as front-engine and front-wheel drive and rear-engine and rear-wheel drive.

9 Claims, 2 Drawing Figures

CHANGE-SPEED GEAR SYSTEM FOR USE IN AUTOMATIC TRANSMISSIONS

BACKGROUND OF THE INVENTION

This invention relates to a change-speed gear system for use in an automatic transmission. More particularly, this invention relates to a change-speed gear system which allows the automatic transmission to be compact in size and alternatively used for various types of vehicular drive systems such as front-engine and front-wheel drive, front-engine and rear-wheel drive, rear-engine and rear-wheel drive and four-wheel drive.

A number of automatic transmissions have been used in vehicles having various types of drive systems, such as front-engine and front-wheel drive (FF), front-engine and rear-wheel drive (FR), rear-engine and rear-wheel drive (RR), and four-wheel drive (4D).

However, it has appeared impossible to interchange the conventional automatic transmissions, for example, from a front-engine and rear-wheel drive to a front-engine and front-wheel drive, because of the varying constructions of the various parts built therein. This is also true with the application of conventional automatic transmissions from front-engine and rear-wheel drive to front-engine and rear-wheel drive or four-wheel drive.

In addition, the manufacture of a new automatic transmission for a different type of drive system results in many disadvantages from the viewpoint of cost, assembly, parts control and servicing. Any application of an existing type of automatic transmission to a different type of drive system has dictated the additional use of separate and new parts and devices. As can be seen, problems are encountered in either adapting an existing type of automatic transmission or utilizing a new automatic transmission to use in a different type of vehicular drive system.

Accordingly, it is a primary object of this invention to provide a change-speed gear system for use in an automatic transmission, which can be easily modified to alternative use in any one of the FF, RR, FR and 4D vehicular drives.

A further object of this invention is to eliminate the costly and time-consuming retrofitting of an automatic transmission to another type of vehicular drive system or the manufacture of a new automatic transmission for another type of vehicular drive system.

Another object of this invention is to provide a change-speed gear system for use in an automatic transmission, which is compact in size and allows a large degree of design variation for an internal combustion engine and a torque convertor.

Additional objects and advantages of the invention will be set forth in part in the description which follows, and in part will be obvious from the descriptions, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the change-speed gear system of the invention comprises a change-speed gear system for use in an automatic transmission comprising a center output shaft having actuating opposite ends; a hollow input shaft coaxially disposed around one end of the output shaft; a hollow intermediate shaft coaxially disposed around the output shaft; first and second planetary gear mechanisms, each mechanism including a sun gear, a ring gear, and a planetary carrier rotatably supporting the planetary pinion, the sun gears being secured to the intermediate shaft, and the planetary carrier and the ring gear, respectively, of the first and second planetary gear mechanisms being secured to the output shaft; first and second selectively actuatable clutches, each clutch having a drivable portion and a driving portion engageable with the said drivable portion, the driving portions of the clutches being coupled to the input shaft and the drivable portions of the first and second clutches being respectively coupled to the ring gear of the first planetary gear mechanism and to the intermediate shaft; and first and second selectively actuatable brakes, each brake having a non-movable portion and a movable portion engageable with the non-movable portion, the movable portions of the first and second brakes respectively coupled to the intermediate shaft and to the planetary carrier of the second planetary gear mechanism; and wherein selective actuation of the first and second clutch means and the first and second brake means establishes three forward-speed gear ratios and one reverse-speed gear ratio.

Preferably, the change-speed gear system further includes a unidirectional clutch means for preventing movement in one direction of the planetary carrier of the second planetary gear mechanism.

In one preferred embodiment of the change-speed gear system, power is transmitted from the end of the output shaft adjacent the input shaft such as in the application of the change-speed gear system to a vehicular FF or RR drive.

In still another preferred embodiment of the changespeed gear system, power is transmitted from the end of the output shaft opposite the input shaft, such as in the application of the change-speed gear system to a vehicular FR drive.

In yet another preferred embodiment of the change-speed gear system, the power is transmitted from both opposing ends of the output shaft such is in the application of the change-speed gear system to a vehicular 4D drive.

The invention consists in the novel parts, constructions, arrangements, combinations and improvements shown and described. The accompanying drawing, which is incorporated in and constitutes a part of this specification, illustrates one embodiment of the invention and, together with the description, serves to explain the principles of the invention.

OF THE DRAWING

Figure 2:
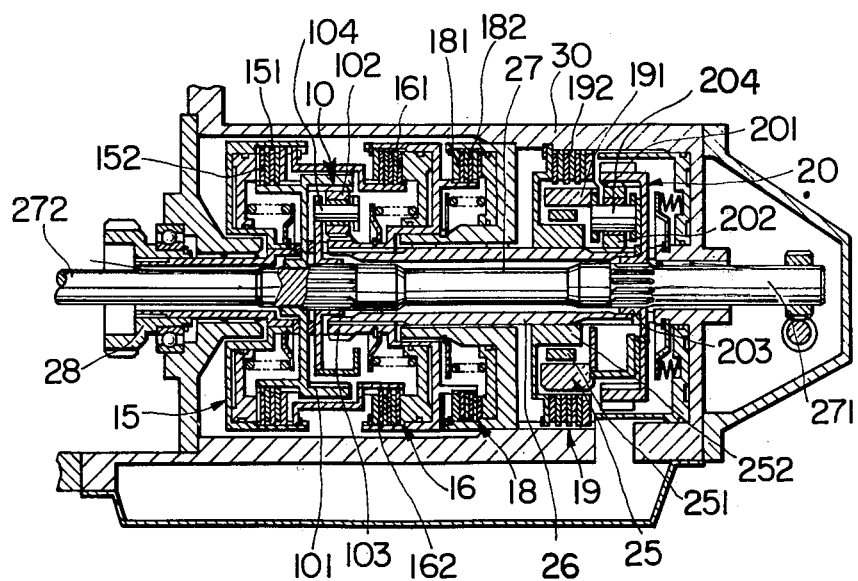

FIG. 1 is a schematic diagram of the change-speed gear system for use in an automatic transmission constructed in accordance with the teachings of this invention; and FIG. 2 is a longitudinal cross-sectional view of the change-speed gear system of FIG. 1, showing detailed construction thereof.

Reference will now be made in detail to the present preferred embodiment of the invention, an example of which is illustrated in the accompanying drawing.

Referring now to FIGS. 1 and 2, there is shown a change-speed gear system for use in a three-forward-speed and one-reverse-speed automatic transmission.

In accordance with the invention, the change-speed gear system includes an output shaft 27, an input shaft 28, first and second planetary gear mechanisms 10 and 20, first and second clutch means 15 and 16, and first and second brake means 18 and 19. Preferably, the change-speed gear system is housed in part of transmission casing 30 and further includes a unidirectional clutch means 25.

In accordance with the invention, the output shaft 27 is centrally disposed and has opposing ends 272 and 271. As herein embodied, power is transmitted from the end 272 of the output shaft 27 such as in the application of the change-speed gear system to a vehicular FF or RR drive. As will be described and shown below, power may be transmitted from the end 271 or both the ends 272 and 271 of the output shaft 27.

In accordance with the invention, the input shaft 28 is hollow and coaxially disposed around the output shaft 27, such as at end 272. Preferably, the input shaft 28 is driven by a torque converter (not shown) of an internal combustion engine. Also, in accordance with the invention, and as best seen in FIG. 2, an intermediate shaft 26 is hollow and coaxially disposed around the output shaft 27.

In accordance with the invention the first planetary gear mechanism 10 includes a planetary pinion 102, a planetary carrier 104 which rotatably supports the planetary pinion 102 and is secured to the output shaft 27, a sun gear 103 which is meshed with the planetary pinion 102 and secured to the intermediate shaft 26, and a ring gear 101 which is meshed with the planetary pinion 102 and rotatably mounted on the output shaft 27. As will be described in further detail below, the ring gear 101 is also operatively coupled to the first clutch means 15.

As herein embodied, the first planetary gear mechanism 10 is positioned around the output shaft 27 and between the first and second clutch means 15 and 16 so that the ring gear 101 is adjacent and slightly below the first clutch means 15. Preferably, the sun gear 103 is adjacent an end portion of the intermediate shaft 26 for direct coupling thereto while the ring gear 101 and the planetary carrier 104 are positioned close to the output shaft 27, the ring gear 101 for rotatable mounting thereto and the planetary carrier 104 for direct coupling thereto.

In accordance with the invention, the second planetary gear mechanism 20 includes a planetary pinion 202, a planetary carrier 204 rotatably supporting the planetary pinion 202, a sun gear 203 which is meshed with the planetary pinion 202 and secured to the intermediate shaft 26, and a ring gear 201 which is meshed with the planetary pinion 202 and secured to the output shaft 27. As will be described in further detail below, the planetary carrier 204 is operatively coupled to the second brake means 19.

As herein embodied, the second planetary gear mechanism 20 is positioned around the output shaft 27 toward the end 271 and adjacent the second brake means 19 so that the planetary carrier 204 is directly coupled thereto. Preferably, the sun gear 203 is adjacent the other end of the intermediate shaft 26 from the sun gear 103 for direct coupling to the intermediate shaft 26. Ring gear 201 is directly connected to the output shaft 26 toward the end 271.

In accordance with the invention, the first clutch means 15 is selectively actuated for the first, second, and third forward speed-gear conditions. The first clutch means 15 has a drivable portion 152 secured to the ring gear 101 of the first planetary gear mechanism 10 and a driving portion 151 secured to the input shaft 28 and engageable with the drivable portion 152 when the first clutch means 15 is selectively actuated. It is preferred that the first clutch means 15 be positioned adjacent the input shaft 28 and first planetary gear mechanism 10 so that drivable portion 152 is directly coupled to the ring gear 101 and the driving portion 151 is directly coupled to the input shaft 28. As herein embodied, the first clutch means 10 is a multiple-disc clutch type and includes a conventional hydraulic servo-mechanism for actuating the first clutch means 10.

In accordance with the invention, the second clutch means 16 is selectively actuated for the third forward speed-gear and reverse speed-gear conditions. The second clutch means 16 has a driving portion 161 secured to the input shaft 28 and a drivable portion secured to the intermediate shaft 26 and engageable with the driving portion 161 when the second clutch means 16 is selectively actuated. It is preferred that the second clutch means 16 be positioned adjacent to the first clutch means 15 so that the driving portion 161 is extended to the first clutch means 15 and directly coupled to the driving portion 151. It is also preferred that the second clutch means 16 be positioned adjacent to the intermediate shaft 26 so that the drivable portion 162 can also be directly coupled to the intermediate shaft 26. As herein embodied, the second clutch means 16 is a multiple-disc clutch type and includes a conventional hydraulic servo-mechanism for actuating the second clutch means 16.

In accordance with the invention, first brake means 18 is selectively actuated for the second forward speed-gear condition. The first brake means 18 has a non-movable portion 182 and a movable portion 181. The movable portion 181 is secured to the intermediate shaft 26 and coupled to the drivable portion 162 of the second clutch means 16, and engageable with the non-movable portion 182 when the first brake means 18 is selectively actuated. It is preferred that the first brake means 18 be positioned adjacent the second clutch means 16 so that movable portion 181 is directly coupled to the drivable portion 162. Preferably, the non-movable portion 182 is supported by and secured to the transmission casing 30. As herein embodied, first brake means 18 is a brake of the multiple-disc clutch type and includes a conventional hydraulic servo-mechanism for actuating the brake.

In accordance with the invention, second brake means 19 is selectively actuated for the first forward speed-gear and reverse speed-gear conditions. The second brake means 19 has a non-movable portion 192 and a movable portion 191. Movable portion 191 is coupled to the planetary carrier 204 and engageable with the non-movable portion 192 when the second brake means 19 is selectively actuated. Since it is preferred that the second brake means 19 be located adjacent to the second planetary gear mechanism, the movable portion 191 is directly coupled to the planetary carrier 204. Preferably, the non-movable portion 192 is supported by and secured to the transmission casing 30. As herein embodied, the second brake means 19 is a brake of the multiple-disc clutch type and includes a conventional hydraulic servo-mechanism for actuating the brake.

As noted previously, the change-speed gear system preferably includes a unidirectional clutch means 25 for preventing movement in one direction of the planetary carrier 204 of the second planetary gear mechanism 20. As herein embodied, unidirectional clutch means 25 is engaged for the first forward speed-gear condition. The clutch means 25 has a non-movable portion 252 supported by and secured to the transmission casing 30 and a movable portion 251 engageable with the non-movable portion 252. Preferably, both the movable portion 191 of the second brake means 19 and the planetary carrier 204 of the second planetary gear mechanism 20 are coupled to the movable portion 251 of the unidirectional clutch means 25. As best seen in FIG. 2, unidirectional clutch means 25 is positioned adjacent the second brake means 19 and the second planetary gear mechanism 20 so that the movable portions 191 and 251 and the planetary carrier 204 are directly coupled together.

The operation or engagement of the engaging elements, such as the clutch means 15 and 16, the brake means 18 and 19, and one-way clutch 25, in the three forward-speed-gear and one reverse-speed gear ratios are summarized in Table I, as set forth below. In Table I, the mark 'O' represents the engaging condition, while the mark 'X' represents the non-engaging or released condition.

TABLE I

| Gear | Engaging Elements | | | | |
|---|---|---|---|---|---|
| | Clutch 15 | Clutch 16 | Brake 18 | Brake 19 | Uni-Directional Clutch 25 |
| First | O | X | X | (O) | O |
| Second | O | X | O | X | X |
| Third | O | O | X | X | X |
| Reverse | X | O | X | O | X |

During the operation of the speed-change gear system, the power is transmitted for the various speed-gear ratios in a manner as will not be described.

During the first speed-gear ratio, power is transmitted from the input shaft 28 to the output shaft 27 when clutch means 15 and the unidirectional clutch means 25 or the second brake means 19 are actuated. Power is transmitted from the input shaft 28 through engaging first clutch means 15 to the ring gear 101, through the planetary pinion 102 to the sun gear 103. Since sun gear 103 is coupled to the intermediate shaft 26, the intermediate shaft 26 is rotated in a direction opposite to that of the ring gear 101. Since unidirectional clutch means 25 is engaged, the planetary carrier 204 remains stationary. Therefore, power is transmitted to the ring gear 201 from the sun gear 203 and intermediate shaft 26 so that the output shaft 27 is rotated in the same direction as that of the input shaft 28 at reduced revolutions per minute or R.P.M.

During the second speed-gear ratio, power is transmitted from the input shaft 28 to the output shaft 27 when the first clutch means 15 and the first brake means 18 are actuated. Since the first brake means 18 is in engagement, the intermediate shaft 26 remains stationary as well as the sun gears 103 and 203, and no power is transmitted through the second planetary gear mechanism 20 to the output shaft 27.

However, since the first clutch means 15 is in engagement, power is transmitted to the ring gear 101 from the input shaft 28. This power is transmitted in turn to the output shaft 27 through the planetary carrier 104 in a manner that the output shaft 27 is rotated in the same direction as that of the input shaft 28.

During the third speed-gear ratio, power is transmitted from the input shaft 27 to the output shaft 28 when the first and second clutch means 15 and 16 are actuated. Since both the first and second clutch means 15 and 16 are in engagement and coupled to the input shaft 28, both the ring gear 101, which is coupled to the first clutch means 15, and the sun gear 103 which is coupled to the second clutch means 16, are rotating jointly in the first planetary gear mechanism 10. Therefore, power from the input shaft 28 is transmitted to the planetary carrier 104 through the planetary pinion 102, which is meshed with the ring gear 101 and the sun gear 102 and rotatably supported by the planetary carrier 104. Since the planetary carrier 104 is coupled to the output shaft 27, power is transmitted to the output shaft 27 in a manner that the output shaft 27 is rotated in the same direction as that of the input shaft 28.

During the reverse speed-gear ratio, power is transmitted from the input shaft 28 to the output shaft 27 when the second clutch means 16 and the second brake means 19 are actuated. Since the second clutch means 16 is in engagement, power is transmitted from the input shaft 28 to the intermediate shaft 26 so that the intermediate shaft 26 is rotating in the same direction as the input shaft 28. Since the second brake means 19 is engaged, the planetary carrier 204 remains stationary. Therefore, power is transmitted to the ring gear 201 from the sun gear 203 and intermediate shaft 26 so that the output shaft 27 is rotated in the opposite or reverse direction as that of input shaft 28.

As can now be seen, if power is transmitted from the end 271 of the output shaft 27 opposite to the input shaft 27, then the speed-change gear system of this invention can be used for a vehicular FR drive. Furthermore, if power is transmitted from the end 272 of the output shaft 27 adjacent the input shaft 28, then the speed-change gear system of this invention can be used for a vehicular FF or RR drive. Finally, if power is transmitted from both the ends 271 and 272 of the output shaft 27, then the speed-change gear system of this invention can be used for a vehicular 4D drive.

As is apparent from the foregoing description of the change-speed gear system of this invention, there may be achieved a compact automatic transmission which can be used alternatively for any one of the vehicular FR, FF, RR and 4D drives, by only minor attachment or replacement of a few parts of the change-speed gear system. Furthermore, this change-speed gear system allows for a large degree of design variation and flexibility for an internal combustion engine and a torque convertor.

It will be apparent to those skilled in the art that various modifications and variations could be made in the change-speed gear system of the invention without departing from the scope or spirit of the invention.

What is claimed is:

1. A change-speed gear system for use in an automatic transmission comprising:
   a. a center output shaft having actuating opposite ends;
   b. a hollow input shaft coaxially disposed around one end of said output shaft;
   c. a hollow intermediate shaft coaxially disposed around said output shaft;
   d. first and second planetary gear mechanisms, each mechanism including a sun gear, a ring gear, a planetary pinion meshing with said sun gear and said ring gear, and a planetary carrier rotatably supporting said planetary pinion, said sun gears being secured to said intermediate shaft, and said planetary carrier and said ring gear, respectively, of said first and second planetary gear mechanisms being secured to said output shaft;
   e. first and second selectively actuatable clutch means between which is positioned said first planetary gear mechanism, each clutch means having a drivable portion and a driving portion engageable with said drivable portion, said driving portions of said clutch means being coupled to said input shaft and said drivable portions of said first and second clutch means being respectively coupled to said ring gear to said first planetary gear mechanism and to said intermediate shaft; and f. first and second selectively actuatable brake means, each brake means having a non-movable portion and a movable portion engageable with said non-movable portion, said movable portions of said first and second brake means respectively coupled to said intermediate shaft and to said planetary carrier of said second planetary gear mechanism; and wherein selective actuation of said first and second clutch means and said first and second brake means establishes three forward-speed gear ratios and one reverse-speed gear ratio.

2. The change-speed gear system of claim 1, wherein said driving portion of said second clutch means is extended between said first and second clutch means and coupled to said driving portion of said first clutch means.

3. The change-speed gear system of claim 1, further including a unidirectional clutch means for preventing movement in one direction of said planetary carrier of said second planetary gear mechanism.

4. The change-speed gear system of claim 2, including a housing and a unidirectional clutch means for preventing movement in one direction of said planetary carrier of said second planetary gear mechanism, wherein said unidirectional clutch means has a non-movable portion coupled to said housing and a movable portion coupled to said planetary carrier of said second planetary gear mechanism and to said drivable portion of said second brake means and engageable with said non-movable portion.

5. The change-speed gear system of claim 4, wherein said first and second clutch means are of the multiple-disc clutch type, and wherein said first and second brake means are of a multiple-disc clutch type.

6. The change-speed gear system of claim 1, wherein power is transmitted from the end of said output shaft adjacent said input shaft.

7. The change-speed gear system of claim 1, wherein power is transmitted from the end of said output shaft opposite said input shaft.

8. The change-speed gear system of claim 1, wherein power is transmitted from both opposing ends of said output shaft.

9. The change-speed gear system of claim 4, wherein said non-movable portions of said first and second brake means are supported and secured to said housing.

* * * * *

UNITED STATES PATENT OFFICE
CERTIFICATE OF CORRECTION

Patent No. 4,063,468      Dated December 20, 1977

Inventor(s) Kojiro Kuramochi et al.

It is certified that error appears in the above-identified patent and that said Letters Patent are hereby corrected as shown below:

On the Title page insert:

-- [30] Foreign Application Priority Data

December 2, 1975     Japan    50-142 339

Column 7, claim 1, line 6, "to" should be -- of --.

Signed and Sealed this

*Twenty-first* Day of *March 1978*

[SEAL]

*Attest:*

RUTH C. MASON          LUTRELLE F. PARKER
*Attesting Officer*       *Acting Commissioner of Patents and Trademarks*